(No Model.) 2 Sheets—Sheet 1.
G. WARBURTON.
CABLE RAILWAY.
No. 318,332. Patented May 19, 1885.
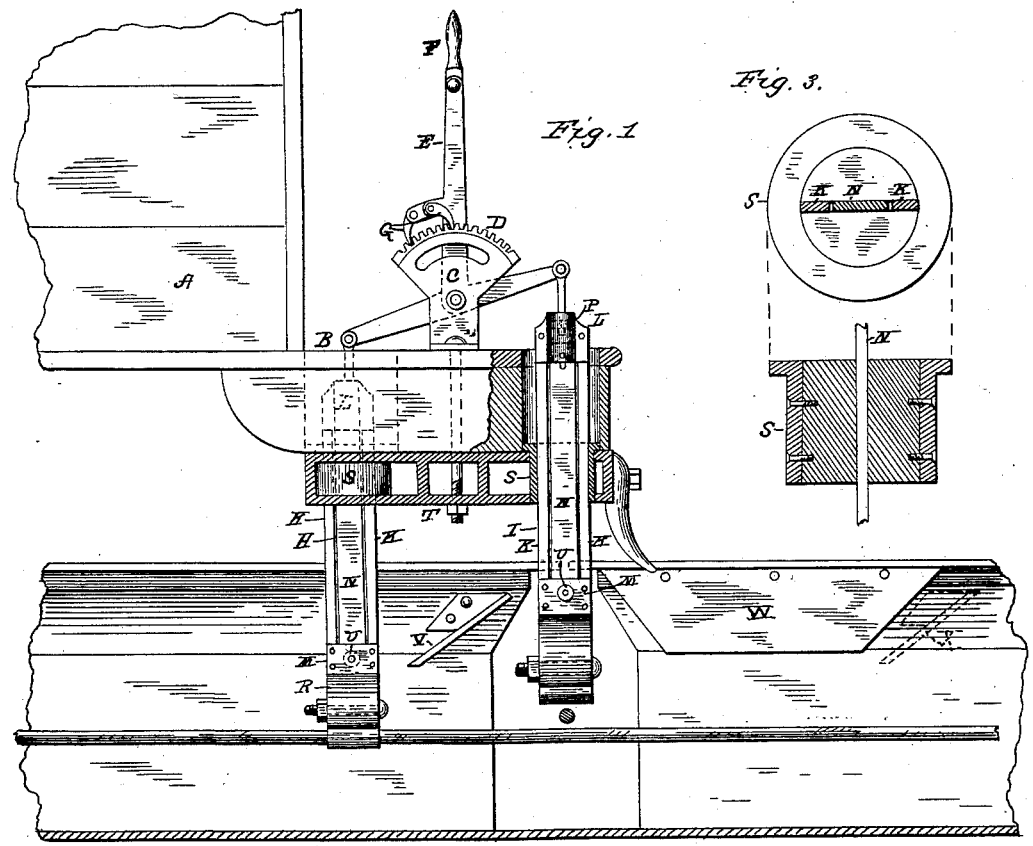
WITNESSES
Chas. D. Davis
Edwin L. Jewell
INVENTOR
George Warburton
Per C. A. Alexander
Attorney

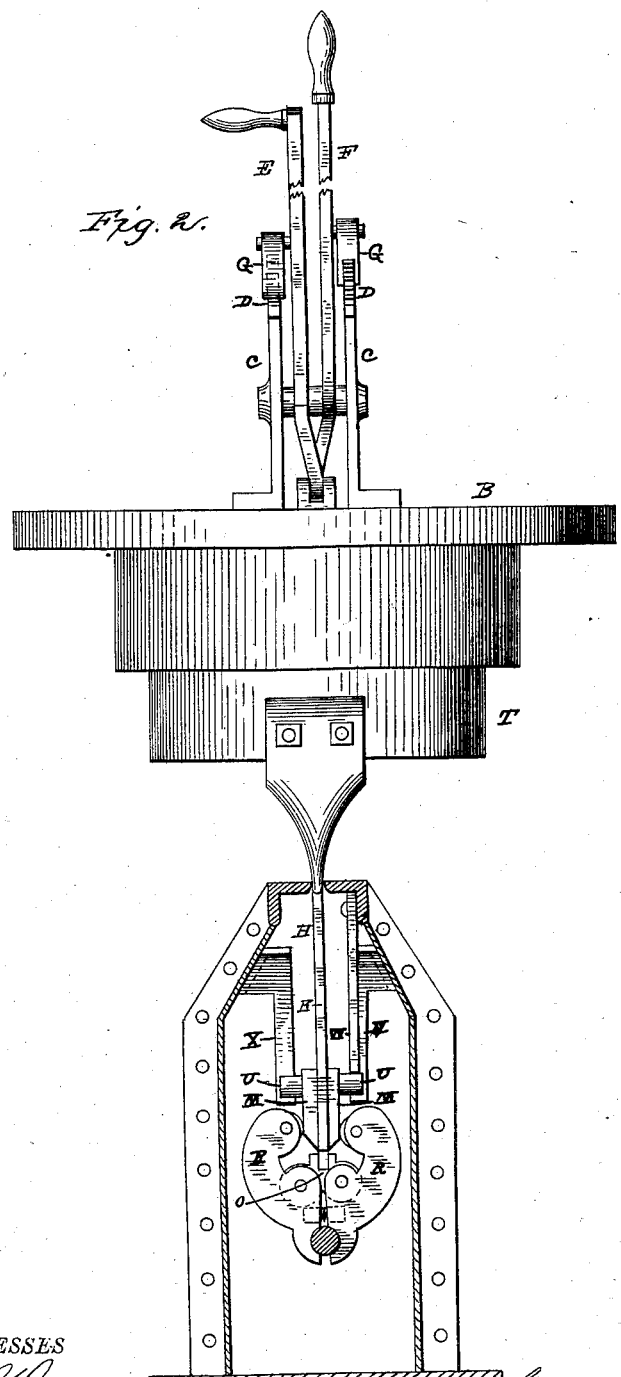

UNITED STATES PATENT OFFICE.

GEORGE WARBURTON, OF PHILADELPHIA, PENNSYLVANIA, ASSIGNOR OF ONE-HALF TO WILLIAM WEBSTER, OF SAME PLACE.

CABLE RAILWAY.

SPECIFICATION forming part of Letters Patent No. 318,332, dated May 19, 1885.

Application filed March 9, 1885. (No model.)

*To all whom it may concern:*

Be it known that I, GEORGE WARBURTON, a citizen of the United States, residing at Philadelphia, in the county of Philadelphia and State of Pennsylvania, have invented certain new and useful Improvements in Cable Railways, of which the following is a specification, reference being had therein to the accompanying drawings.

My invention relates to improvements in cable railways, and is designed to produce a device which will permit the crossing of cables at any angle without interfering with the proper operation of the clutch mechanism.

The improvement consists, essentially, in the employment of an auxiliary clutch in connection with a main one, whereby the continuity of engagement of the car with the cable may be maintained when the cable is being crossed and the main clutch necessarily lifted from the driving-cable.

In describing the device, reference is had to the annexed drawings, showing in Figure 1 a longitudinal section of a cable-way at a crossing and a partial section of the clutch mechanism; Fig. 2, a cross-section of the cable-way and an end view of the clutch; Fig. 3, a detail section, both transverse and longitudinal, of a guide for the clutch; Fig. 4, an end and side view of the clutch-head, and Fig. 5 a side view of the clutch-hanger.

A car, A, has on a platform, B, or any other suitable portion, a standard, C, of one or more parts. This standard supports racks D, formed integral with it or attached and pivotally supports levers E and F, respectively. Each of these levers is supplied with a pawl, G, and with an arm at an angle, so that one arm is down and the other up when the levers are vertical. This is the preferable mode of arrangement. The lower arm by means of a link supports the main clutch H, and the upper arm similarly supports the auxiliary clutch I.

The hanger which supports the clutch-head consists of two outside plates, K, fixed to a socket, L, at their upper ends, and having wedge-plates M at their lower ends, and an inside plate, N, having a slot at the upper end, through which a pin secured to the socket L passes, and at the lower end a double eye-plate, O. The plates are of little thickness, so as to travel in the longitudinal slot in the cable-way cover. The link which connects the lever-arm with the hanger passes into the socket, and is retained with some play by a bolt, P.

The clutch is formed of two plates, R, pivoted to the double eye-plate O. The lower arms of the clutch-plates are hollowed semi-cylindrically, so as to engage with the cable, and are provided with a spring, which tends to force the lower arms or jaws apart. The upper arms extend above the pivotal points, and are provided with friction-rollers.

To disengage the clutch, the outside plates will move upward, carrying the wedges from engagement with the upper arms of the clutch-plates proper. The spring will then force the jaws apart. When the pin in the socket has reached the end of the slot in the inside plate, that too is lifted, and thus carries the clutch at its lower end above the cable.

To fasten onto the cable, the device is lowered till the jaws engage with the said cable, and then the force of gravity will carry the wedges between the upper arms and force the jaws together. The hangers pass through proper orifices in the floor of the car or its platform, and are passed through swiveling guides S. These guides turn horizontally in their seats in a plate or frame, T, secured to the car, and thus allow the use of the clutches in turning curves.

To the wedge-plates of the clutches are secured rollers U on one side only of the main clutch and on both sides of the auxiliary clutch.

Within the cable-way, in the line of travel of the clutch, and just before the cross-cable is reached, is an incline, V, of sufficient length and pitch to engage with the rollers U and carry the clutch upward, first forcing the wedges out from between the upper arms of the said clutches, and so loosening their grip from the cable. Beyond the crossing is a plate, W, having a downward incline at the end nearest the crossing and an upward incline at the farther end. Beyond this, and on the side of the cable-way opposite that to which the plate W is secured, is an upward incline, X, similar to the one V. On approaching a crossing the pawls are lifted from engagement with the segment-racks and the levers held by the operator. The auxiliary clutch passes over the top of the first incline and engages with the downward incline on the plate W, forcing it to clutch the cable tightly. While this operation is being performed the main clutch has engaged with the first incline and been thereby unfastened from the cable. It is raised sufficiently to carry it over the cross-cable, and it then engages with the plate W, and is again fastened to the cable. About the time the main clutch has firmly gripped the cable the auxiliary clutch has reached the incline X and has begun its travel upward. When this is accomplished, the pawls are dropped in place, and the device is in position to pass over another crossing.

Since slight modifications which cannot be foreseen may be necessary to adapt mechanisms to the peculiar circumstances under which they are used, the invention is not confined to the exact construction shown, the right to vary the same consistent with the spirit of the invention being reserved.

I claim—

1. A clutch consisting of pivoted jaws with extensions beyond the pivotal points, and a wedge acting by gravity to normally close the said jaws, substantially as and for the purpose specified.

2. A clutch consisting of pivoted jaws with extensions beyond the pivotal point, a spring tending to separate the said jaws, and a wedge normally closing the same, substantially as and for the purpose specified.

3. The combination of a clutch consisting of pivoted jaws on the lower end of a plate with a plate or plates carrying wedge-plates, and having a play relative to the plate carrying the jaws, substantially as and for the purpose specified.

4. In combination with a main clutch and an auxiliary clutch, a lever for each, said levers having each an arm at an angle to the longer arm thereof, and provided with a pawl engaging with a fixed rack, substantially as and for the purpose specified.

5. The combination, with a vertically-moving main clutch having a projection on one side and an auxiliary clutch or grip having a projection on each side, of an incline placed before a cable-crossing, a decline beyond it, and both on the same side of the cable-way coincident with projections on both clutches and grips, and an incline beyond the decline and on the other side of the said cable-way, all combining to operate substantially as and for the purpose specified.

In testimony whereof I affix my signature in presence of two witnesses.

GEORGE WARBURTON.

Witnesses:
CHAS. D. DAVIS.
WILLIAM WEBSTER.